United States Patent [19]
Kilian et al.

[11] Patent Number: 5,800,860
[45] Date of Patent: Sep. 1, 1998

[54] METHOD OF MANUFACTURING PLANAR OPTICAL WAVEGUIDES

[75] Inventors: Arnd Hermann Kilian, Summit; Hyung Jong Lee, Westfield; John Burnette MacChesney, Lebanon, all of N.J.

[73] Assignee: Lucent Technologies Inc., Murray Hill, N.J.

[21] Appl. No.: 496,268

[22] Filed: Jun. 28, 1995

[51] Int. Cl.⁶ .................................................... B05D 5/06
[52] U.S. Cl. ................. 427/163.2; 427/165; 427/223; 427/261; 427/269; 427/255; 427/377; 427/379; 427/419.7
[58] Field of Search ............................ 427/165, 419.7, 427/163.2, 379, 377, 269, 255, 261, 223

[56] References Cited

U.S. PATENT DOCUMENTS

| | | | |
|---|---|---|---|
| 3,806,223 | 4/1974 | Keck et al. | 350/96 |
| 3,873,339 | 3/1975 | Hudson | 427/632 |
| 3,934,061 | 1/1976 | Keck et al. | 427/165 |
| 4,302,232 | 11/1981 | Schneider | 427/163.2 |
| 4,368,063 | 1/1983 | Presby | 65/42 |
| 4,425,146 | 1/1984 | Izawa et al. | 65/18.2 |
| 5,059,475 | 10/1991 | Sun et al. | 428/195 |

OTHER PUBLICATIONS

M. Kawachi, "Silica Waveguides on Silicon and their Application to Integrated–Optic Components", *Optical and Quantum Electronics*, vol. 22, 1990, 391–416(no month).

*Primary Examiner*—Janyce Bell
*Attorney, Agent, or Firm*—Oleg A. Alber; Patricia A. Verlangieri

[57] ABSTRACT

A novel planar waveguide structure has been constructed by sintering substantially pure $SiO_2$ layers in a $He_2/BCl_3$ atmosphere. This results in the generation of a liquid phase of substantially lower viscosity than that of the deposited silica by itself. Since viscous sintering is enhanced by the presence of this liquid, consolidation occurs at lower temperature, e.g. 1000°–1100° C., than those used in the prior art, e.g. 1350°–1500° C. Much of the $B_2O_3$ remains unreacted with the silica particles it helps to sinter, acting like a flux to bring about consolidation. This remaining $B_2O_3$ is removed at the conclusion of the consolidation procedure by steam treatment at temperatures of 900°–1100° C. Some boron is incorporated into the silica layer, changing its CTE without substantially increasing its index. Thus, this method improves both structure and processing of planar waveguides by reducing the processing temperature and producing a glass which does not bow the substrate and essentially eliminates birefringence resulting in polarization dependent losses. This greatly benefits sophisticated circuits such as those intended for wavelength diversion multiplexing and allows narrow and precisely positional pass bands.

18 Claims, 3 Drawing Sheets

METHOD OF MANUFACTURING PLANAR OPTICAL WAVEGUIDES

TECHNICAL FIELD

This invention concerns a method of manufacturing planar optical waveguides.

BACKGROUND OF THE INVENTION

Planar optical waveguides are widely used as passive components in optical interconnection systems. These waveguides are distinguished from cylindrical dielectric waveguides, e.g., optical fibers, in that they are substantially rectangular in cross-section. A typical planar optical waveguide includes in succession a first cladding layer having a first index of refraction, a light-guiding core having a second index of refraction which is higher than the first index of refraction, and a second cladding layer overlaying the core and having an index of refraction which also is lower than the second index of refraction. Earlier planar optical waveguides were produced by using a substrate having the first index of refraction as the first cladding layer. However, more recent planar optical waveguides utilize a cladding layer having the first index of refraction positioned between the core and the substrate. This permits formation of the planar optical waveguides on diverse substrates, whether metallized or non-metallized. Furthermore, it permits deposition of the two cladding layers and of the core-forming layer by flame hydrolysis deposition (FHD) process. This process involves deposition of glass particles on a substrate as layers with different index of refraction adjustable by doping the glass particles being deposited on the substrate.

In the FHD process the glass particles are generated by hydrolyzing a mixture of different gaseous chlorides, mainly $SiCl_4$, using an oxy-hydrogen torch. Both cladding layers may be deposited substantially as silica, while the core-forming layer is deposited as silica doped with one or more of at least the following: titanium oxide, tantalum oxide, tin oxide, niobium oxide, zirconium oxide, aluminum oxide, lanthanum oxide, germanium oxide, or other suitable refractive index-modifying dopant materials.

Homogeneous deposits on the substrate are achieved by moving a wafer through the flame by suitable means. After the core-forming layer is deposited, the core layer is lithographically masked and etched, e.g., by reactive ion etching (RIE), to define a core pattern. The patterned layer is then superimposed by the top cladding layer. After deposition, the substrate is heated in a furnace to consolidate the soot into a clear glass layer. This process operates by viscous sintering, typically in a helium atmosphere which readily diffuses from pores of the soot layer allowing their collapse. In case of pure $SiO_2$ this mechanism requires sintering temperatures of 1350°–1500° C. These temperatures could lead to the complete deterioration of the substrate material which is either silicon (melting point 1419° C.) or silica (softening point≈1300° C.). Preferably, each layer produced by FHD is sintered prior to the deposition of a subsequent layer.

Dopants can be added to the mixture of gaseous chlorides at the time of flame hydrolysis to reduce the sintering temperature of the cladding glass deposits to allow sintering at temperatures tolerated by the substrate. However, as one has to be concerned with the dimensional stability of the core regions forming the light guiding ridges, each subsequently deposited layer must be of a lower sintering temperature than the layer underneath. This is no problem in case of the core layer, since it is doped substantially to have a raised refractive index with dopants which, except for $TiO_2$, soften the glass. However, in case of the top cladding layer, this raising of the refractive index, cannot be tolerated. Doping of the soot during the deposition of the cladding layer with $B_2O_3$ which softens the glass without raising the refractive index, is limited since, due to the abundance of water in the oxy-hydrogen flame, the equilibrium

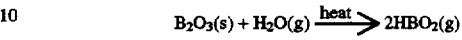

produces mainly gaseous boron species which escape the soot while it is being deposited.

SUMMARY OF THE INVENTION

A novel planar waveguide structure has been constructed by sintering substantially pure $SiO_2$ layers in a $He_2/BCl_3$ atmosphere. This results in the generation of a liquid phase of substantially lower viscosity than that of the deposited silica by itself. Since viscous sintering is enhanced by the presence of this liquid, consolidation occurs at lower temperature, e.g. 1000°–1100° C., than those used in the prior art, e.g. 1350°–1500° C. Much of the $B_2O_3$ remains unreacted with the silica particles it helps to sinter, acting like a flux to bring about consolidation. This remaining $B_2O_3$ is removed at the conclusion of the consolidation procedure by steam treatment at temperatures of 900° C.–1100° C. Some boron is incorporated into the silica layer, changing its CTE without substantially increasing its index. Thus, this method improves both structure and processing of planar waveguides by reducing the processing temperature and producing a glass which does not bow the substrate and essentially eliminates birefringence resulting in polarization dependent losses.

DETAILED DESCRIPTION OF THE INVENTION

Figure 1:
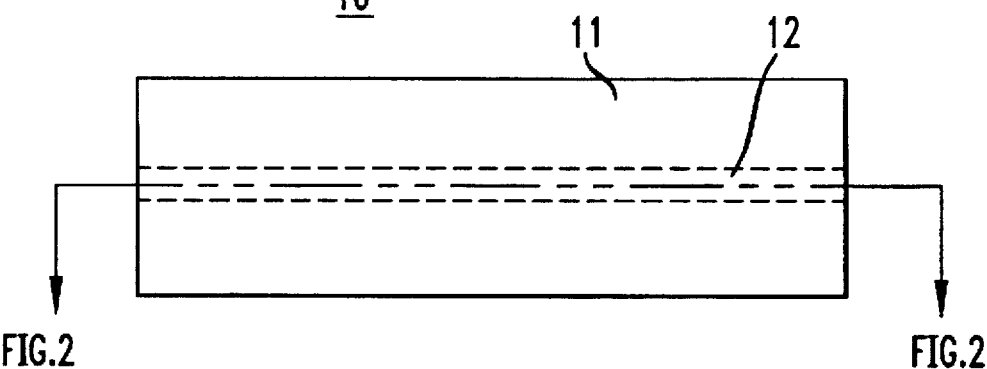
FIG. 1 is a schematic representation of a top view of a typical planar optical waveguide.
Figure 2:
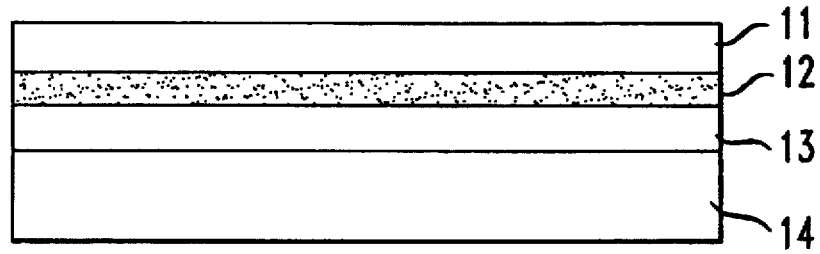
FIG. 2 is a schematic representation in cross-section of a side view of the planar optical waveguide shown in FIG. 1.

Shown in FIG. 1 is a top view of a schematic representation of a typical planar optical waveguide device, 10, having a top cladding layer, 11, and a waveguiding ridge, 12 (shown in phantom). While in this instance is shown a single waveguiding ridge, the ridges may be single or plural, parallel or intersecting, as is well known in the art. Shown in FIG. 2 is a side view in cross-section of waveguide device 10, taken along line 2—2 in FIG. 1. Device 10, as shown in FIG. 2, includes also a lower cladding layer, 13, and a substrate, 14.

Substrate 14 is, typically, of silicon or silica. However, other materials are not excluded, as is well known in the art. Also the substrate may be non-metallized or metallized, that is one having a metallized pattern thereon. Lower cladding layer 13 is typically silica. Cladding layer 13 may be produced by oxidizing the surface of substrate 14 or by depositing on the substrate a silica layer by chemical vapor deposition (CVD) or by flame-hydrolysis followed by sintering. Waveguide ridge 12 is also of silica but doped with dopants which raise the refractive index of the waveguide ridge above that of both top cladding layer 11 and lower cladding layer 13. Top cladding layer 11 is also of silica having refractive index which is lower than that of the waveguiding ridge and, preferably, is equal to the refractive index of the lower cladding layer. The two cladding layers and the ridge form a waveguide in which the optical signal, which propagates through the waveguide ridge, is confined to the waveguide ridge by the top and lower cladding layers.

Figure 3:
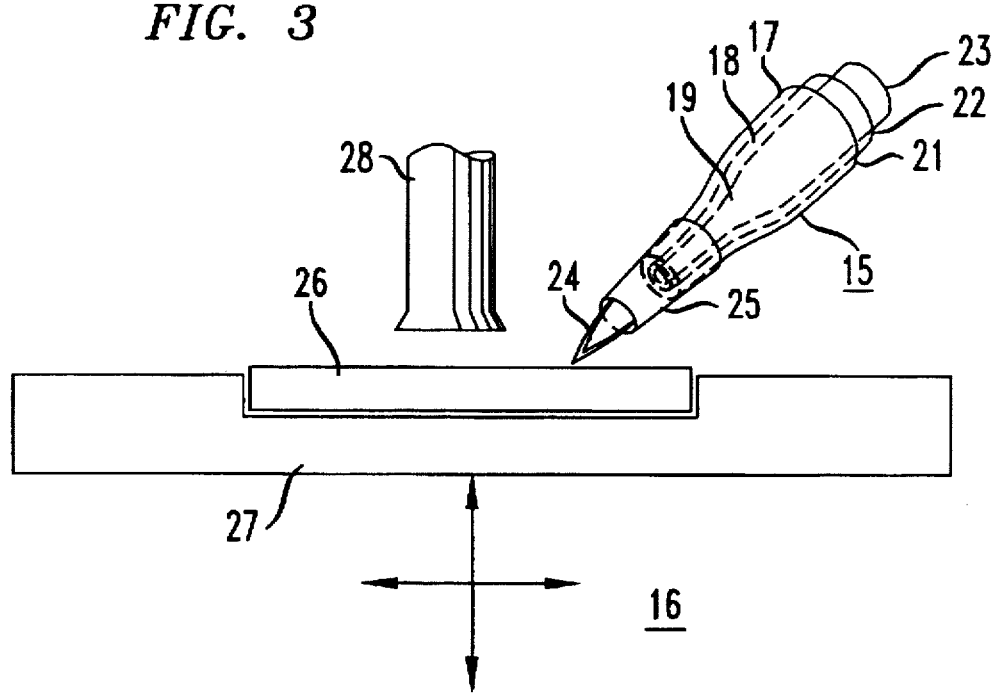
FIG. 3 is a schematic representation of an arrangement for deposition of soot by FHD on a suitable substrate.

The three layers (11, 12 and 13) are, preferably, deposited on substrate 14 by an FHD process. The FHD process is a relatively fast process permitting deposition of a typical 20–40 µm thick soot layer within minutes instead of day(s) needed in the CVD process. An exemplary arrangement being used for FHD process is schematically shown in FIG. 3 and includes a concentric-tube silica torch, 15, and a mechanical device, 16, that holds the substrate and moves it through the torch flame in a suitable pattern to achieve homogeneous deposit. The pattern may be linear, e.g. from right to left, or vice versa, with stepwise advancement across the line of deposition. Alternatively, a number of substrates may be arranged peripherally on a rotating table (not shown) which advances each substrate under the torch. A gas supply system is used to deliver the chlorides of silicon and of at least one of the doping compounds, such as chlorides of germanium, boron, titanium, and phosphorous, but in case of phosphorous the oxychloride is frequently used. $BCl_3$ is a gas and is metered directly using a mass flow controller. The other sources are liquids at room temperature and are metered by bubbling helium at a controlled flow rate through them while carefully adjusting the liquid temperature. The flow rate of the combustion gases, hydrogen and oxygen, and additional helium are also regulated with the help of mass flow controllers.

The concentric tube torch is patterned after the vapor axial deposition (VAD) torch made up from several concentric silica tubes fused together at one end to form concentric, annular gas outlets at the other end. In an exemplary embodiment, torch 15 includes three concentric silica tubes, 17, 18 and 19. Inlets, 21, 22 and 23, serve to feed the respective gases into the appropriate tubes. Inlet 21, joined to outermost tube 17, carries oxygen, inlet 22, joined to the next, inner tube 18, supplies the hydrogen with additional helium, while inlet 23, joined to innermost tube 19, carries the reactants in mixture with additional hydrogen. Thus, a ring shaped flame, 24, results in which the gaseous reactants are converted into oxide particles. A shroud, 25, made from a silica tube slides over the outside of the torch extending about 30 mm past the torch end. It shields the flame to reduce the influence of external air drafts. The torch points downward at the horizontal substrate at an angle of approximately 60° from the horizontal and the high flow rate of the combustion gases causes them to impinge on the substrate. The substrate, in exemplary experiments, is either a silicon wafer or a silica wafer, 26, which is held in a recessed circle in an aluminum plate, 27, with the help of a vacuum. In the exemplary embodiment the plate is moved linearly back and forth, in an x-direction, at about 20 mm per minute, and after each pass the plate is moved approximately one mm to the side, in a y-direction, until the entire surface of the substrate has been covered. This is achieved with computer controlled XYZ positioning system 16. The third axis controls the rotary movement of the deposition plate. After a complete cycle, that is, after the entire wafer has been covered with the zigzag pattern, the substrate is turned 180° and the pattern is started in a different direction. This improves the homogeneity of the deposit.

Aluminum plate 27 is maintained typically at a temperature of approximately 200° C. using an electric heater (not shown). An additional cooling device (not shown) in the form of a pressured air-cooled copper tube is mounted between the heater and the aluminum plate and a K-type thermocouple with the necessary electronic control circuit. The aluminum plate temperature can rise to 240° C. and even higher depending on the flame temperature; however this does not affect the deposition to any apparent degree.

An exhaust intake, 28, is mounted near flame 24 at about 25 mm distance from torch 16 and 10 mm above the deposition surface. The exhaust intake is activated only during the deposition of the core layer. This assures that during the core layer deposition, soot from the outer, colder region of the flame is swept away before depositing on the substrate. The exhaust removes this portion of the soot, assuring that only soot from the inner portion of the flame is deposited as a core layer; otherwise, subsequent sintering of the core layer would be impeded because of agglomerates resulting in larger voids characteristic of this particular type of soot. The exhaust intake is not needed when depositing cladding layers. Since the deposition efficiency is substantially higher without the exhaust, exhaust intake 28 is deactivated when preparing the cladding layers. Soot from the whole of the flame, including the outer colder region of the flame, leads to the larger porosity of the agglomerated soot in the cladding layers enabling penetration of the deposit with gases during sintering.

Figure 4:
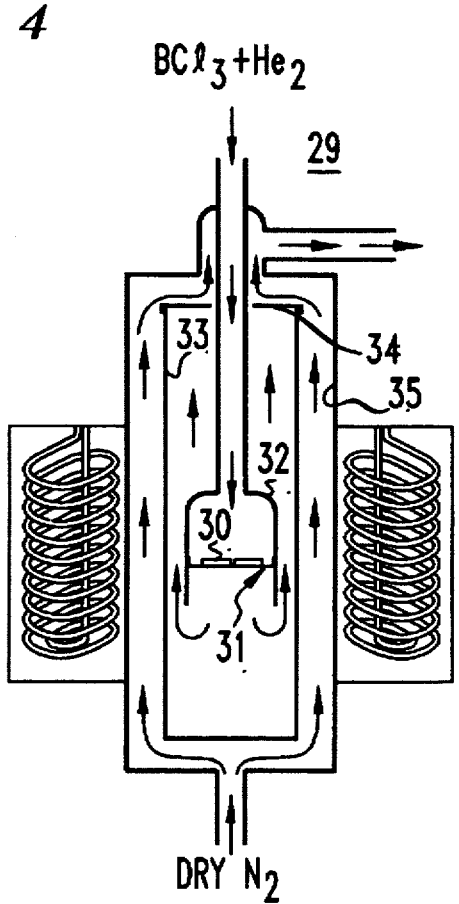
FIG. 4 is a schematic representation of an arrangement for sintering soot layer(s) into glass.

A sintering furnace, 29, shown in FIG. 4, for the reactive atmosphere sintering is a vertical $MoSi_2$ heating element furnace, capable of 2000° C. per hour heat rate. Wafers, 30, to be sintered are held in a boat, 31, which is positioned in a furnace shroud, 32. The wafers may be held horizontally or, preferably, vertically. Gases used during sintering are injected at the top of shroud 32, pass the substrates and flow through the gap between the shroud and a furnace muffle, 33, venting at the top of the furnace muffle cap, 34. The sintering gases include helium and $BCl_3$ or $BF_3$. Dry $N_2$ is flowed between walls, 35, of the furnace and the furnace muffle. Silica muffle 33 assures complete exclusion of air. Otherwise the $BCl_3$ or $BF_3$ would react with moisture or at elevated temperature with $O_2$. The viscosity which controls the sintering rate is reduced due to the addition of $BCl_3$ or $BF_3$ gases sufficiently to allow sintering of the soot to a smooth glass consistency at temperatures as low as 1000° C. Addition of $BCl_3$ within a range of from about 1 percent to 5 percent to helium atmosphere is adequate under the appropriate conditions to achieve this remarkable reduction in sintering temperature.

A sintering process according to this invention includes purging the furnace with helium for a period of from 1.5 to 2.5 hours, preferably 2 hours. The purging takes place with wafers placed in position and at low temperature, preferably at room temperature. Toward the end of the purging period, e.g. 15–20 minutes before the end of the purging period, $BCl_3$ or $BF_3$ gas is introduced into the stream of helium. The temperature of the furnace is then slowly raised over a period of 1.5 to 2.5 hours, preferably 2 hours, from the original low temperature to a temperature of from 800 to 900 degrees centigrade. At the end of this temperature raising period, the flow of $BCl_3$ or $BF_3$ is discontinued, while the flow of helium is being continued. After a 15–20 minute period, the temperature of the furnace is raised over a period of about 2 hours to 1000°–1100° C., and maintained at that level for a period of about one hour. After the flow of helium is discontinued, the sintered wafers are subjected to a 5–7, preferably 6 hours anneal in a steam-and-oxygen atmosphere at 1000°–1150° C., within the furnace. The furnace is then allowed to cool to the room temperature. The substrates are annealed in steam at 1000°–1150° C. for several hours to remove excess $B_2O_3$ at the surface as volatile $HBO$ or $HBO_2$ species thus eliminating hygroscopicity of the film.

Glass layers suitable for a cladding up to 20–25 μm thick have been prepared in this way. They have a uniform refractive index of from 1.457 to 1.461 (depending on the phosphorous content) as determined from their mode patterns. This indicates good compositional homogeneity and shows surprisingly low birefringence. Sintering in such a reactive atmosphere operates according to the following reaction:

$$3SiO_2 + 4BCl_3 \xrightarrow{Heat} 3SiCl_4 + 2B_2O_3.$$

For this reaction to occur at the particle surface, the $BCl_3$ has to diffuse through the soot layer. To avoid concentration gradients, the soot has to be as permeable as possible, so that the extent of $B_2O_3$ formation is limited by the reaction speed.

Figure 5:
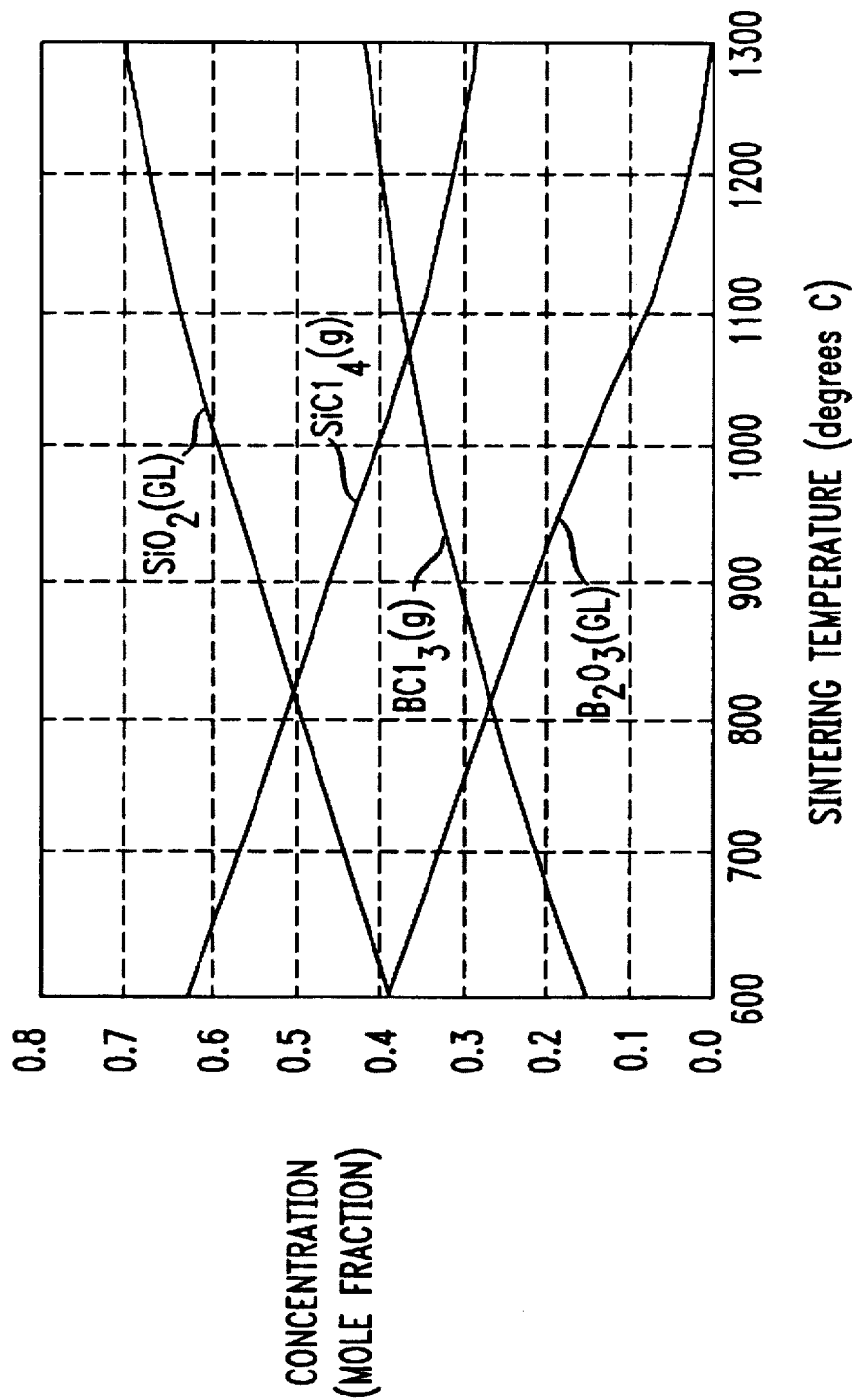
FIG. 5 is a plot of concentration of gaseous species versus temperature for reaction $3SiO_2+4BCl_3 \rightarrow 3SiCl_4+2B_2O_3$.

In FIG. 5 is shown a diagram representing equilibrium between one mole of $BCl_3$ and 1 mole $SiO_2$ as a function of temperature. Concentration in terms of mole fraction shows with rising temperature a decrease in production of $B_2O_3$ according to the reaction $4BCl_3 + 3SiO_2 \rightleftharpoons 3SiCl_4 + 2B_2O_3$.

An exemplary preparation of the individual layers and their sintering are presented in the following Examples. In all of the examples involving deposition of soot layer by FHD, oxygen is flowed at 20 L/min. through outermost tube 17, hydrogen at 2 L/min and helium at 4.5 L/min through middle tube 18, and hydrogen at 1.2 L/min and helium at 1.0 L/min admixed with reactants, as needed, through center tube 19.

EXAMPLE 1

A typical lower cladding layer 13 is made by depositing soot by FHD onto substrate wafers kept at about 200° C. The reactants are provided by bubbling additional helium through respective liquid source at a rate of 150 cc/min for $SiCl_4$ and 250 cc/min for $POCl_3$, while gaseous $BCl_3$ is flowed at 40 cc/min; all reactant sources are kept at 35° C. The soot deposition continues until a 20–40 micrometer thick soot layer is deposited on the substrate.

EXAMPLE 2

Wafers with the silicon oxide soot layer deposited on the substrate in Example 1, are then positioned in furnace 29 for sintering. The sintering procedure starts with a 2 hour purge of the furnace at room temperature with 300 cc/min of helium. Toward the end of the purge, e.g. about 15–20 minutes before the end of the two-hour period, gaseous $BCl_3$ is added at 3.5 cc/min into the helium stream. The temperature is then raised over a period of 2 hours to 800° C. at which time the flow of $BCl_3$ is stopped, while the flow of helium is being continued. After 15–20 minutes, the temperature is raised over a period of 2 hours from 800° C. to 1100° C. and held there for a period of one hour. Thereafter, the flow of helium is discontinued and the sintered wafers are subjected to a 6 hour anneal in a steam-and-oxygen atmosphere at 1150° C. The furnace is then allowed to cool to the room temperature.

EXAMPLE 3

The core layer is made by depositing soot upon the lower cladding layer. The reactants are provided by bubbling helium through respective liquid sources kept at 350° C. at a rate of 100 cc/min for $SiCl_4$, 50 cc/min for $GeCl_4$ and 100 cc/min for $POCl_3$.

EXAMPLE 4

The soot layer deposited in Example 3 is then consolidated by sintering in the furnace. The sintering procedures starts at room temperature with a 2 hour purge of the furnace with 300 cc/min of helium. Toward the end of purge $GeCl_4$ is added by bubbling 200 cc/min of helium through its liquid source and gaseous $BCl_3$ is added at 0.5 cc/min to the helium stream. The furnace temperature is raised to 1300° C. and the soot layer is sintered in an oxygen atmosphere over a period of 2 hours. After this sintering, a chromium mask was formed on top of the sintered core glass layer using standard photolithography. The chromium serves as a mask in the reactive ion etching (RIE) of a desired waveguide pattern in the core glass layer. After patterning of the core glass layer by RIE and the removal of the chromium mask, the resultant core glass pattern is ready to be overclad with a top cladding layer.

EXAMPLE 5

The upper cladding layer is made by depositing soot upon the patterned core waveguide and on exposed portions of the lower cladding layer, prepared as described in Example 4. The reactants are provided by bubbling helium through respective liquid sources at a rate of 150 cc/min for $SiCl_4$ and 200 cc/min for $POCl_3$, while gaseous $BCl_3$ is flowed at 30 cc/min. The soot deposition continues until a 20–40 micrometer thick soot layer is deposited.

EXAMPLE 6

After the silicon oxide soot layer is deposited in accordance with the procedure of Example 5, the wafers are positioned in the furnace for sintering. The sintering procedure starts with a 2 hour purge of the furnace at room temperature with 300 cc/min of helium. Towards the end of the purge period, gaseous $BCl_3$ is added at 5 cc/min to the helium stream. The $BCl_3$ flow continues for about 2.5 hours while the furnace temperature is raised to 800° C., at which time the flow of $BCCl_3$ is discontinued while the flow of helium is maintained. After 15–20 minutes, the furnace temperature is raised over a period of 2 hours to 1100° C. where it is held for one hour. Thereafter, the flow of helium is discontinued and the wafers are subjected to an anneal in a steam-oxygen atmosphere at 1000° C. for a period of 6 hours. The furnace is then allowed to cool to the room temperature.

EXAMPLE 7

The sintering of either one of the cladding layers may be conducted using $BF_3$, instead of $BCl_3$, in the sintering atmosphere. For this purpose, the cladding soot layer is deposited by providing the reactants by bubbling helium through respective liquid sources at 150 cc/min for $SiCl_4$ and 125 cc/min for $POCl_3$, while gaseous $BCl_3$ is flowed at 30 cc/min. The sintering of the cladding soot layer begins with a 2 hour purge of the furnace at room temperature with helium flowing at 300 cc/min. Toward the end of the purge period, gaseous $BF_3$ is flowed at 15 cc/min into the helium stream. The $BF_3$ is less reactive than $BCl_3$ and a higher flow rate of $BF_3$ is needed during the treatment in the furnace. The temperature of the furnace is raised over a period of 2 hours to 900° C., at which time the flow of $BF_3$ is discontinued but the flow of helium is continued. After 15–20 minutes, the furnace temperature is raised over a period of 2 hours to 1100° C. and held there for a period of one hour. Thereafter, the flow of helium is discontinued and the wafers are subjected to an anneal in a steam-and-oxygen atmosphere for a period of 6 hours. The furnace is then allowed to cool to the room temperature.

EXAMPLE 8

Alternatively, the lower cladding layer was grown on a silicon wafer by growing a 15–25 micrometer thick silicon oxide layer in a $HiPO_x$ apparatus (high temperature, high pressure). This procedure does not require subsequent sintering of the cladding layer. The core layer was formed on this cladding layer by first depositing a soot layer in the manner described above in Example 3. The soot layer was then sintered at 1300° C. in air. After this sintering, a chromium mask was formed on top of the sintered core glass layer using standard photolithography. The chromium serves as a mask in the reactive ion etching (RIE) of the core glass layer. After patterning of the core glass layer by RIE and the removal of the chromium mask, the resultant core glass pattern was overclad using the procedure described in Examples 5 and 6 or 7.

Optical measurements indicate good homogeneity, and losses were measured to be comparable to layers fabricated with standard methods.

Additional benefits result from the higher doped glass produced by this reactive atmosphere sintering. The most commonly used substrate material is silicon, which has a substantially high thermal expansion coefficient ($35\times10^{-6}$/K) than silica ($5\times10-6$/K). The resulting mismatch between the substrate and the deposited layers results in stress related problems and the inherent advantage of glass as a waveguide material, namely the absence of birefringence because of its amorphous nature, is lost. Strain birefringence leads to undesired effect as additional loss and polarization sensitivity. In the case of FHD, the material is typically only deposited on one side of the substrate. The resultant strain can warp the substrate to a degree to make photolithograph impossible. However, with increasing dopant content the thermal expansion of silica increases. Glass layers up to 20–25 μm thick could be formed without appreciable warping of the substrate. Indeed wafers are little bowed with radius of curvature as high as 60 meters. This leads to a reduction in the birefringence.

We claim:

1. The method of manufacturing planar optical waveguides, which comprises forming upon a substrate selected from a group consisting of silicon and silica a lower cladding layer comprising silica having a first index of refraction, forming upon the lower cladding layer at least one waveguiding ridge comprising silica having a second index of refraction which is higher than said first index of refraction, forming on said at least one waveguide ridge and on exposed regions of the lower cladding layer an upper cladding layer comprising particles of silica having an index of refraction which is lower than said second index of refraction, said upper cladding layer is formed by depositing a layer of soot particles comprising silica and sintering the soot particles in a helium-containing atmosphere into a glassy layer, wherein, said sintering is conducted by heating the soot layer in a helium atmosphere containing a gaseous additive selected from the group consisting of $BCl_3$ and $BF_3$ at temperatures of from 800° to 900° C., sintering the heated soot layer at a temperature ranging from 1000° to 1100° C. in absence of said gaseous additive, annealing the sintered structure in a steam-and-oxygen atmosphere at a temperature of from 1000° to 1150° C., and allowing the annealed layer to cool to room temperature.

2. The method of claim 1, in which said sintering is conducted in a furnace which is purged at a low temperature with a stream of helium, said gaseous additive is added into the helium stream toward the end of the helium purge and the furnace temperature is raised over a period of from 1.5 to 2.5 hours to the heating temperature of from 800° to 900° C., 15–20 minutes after reaching said heating temperature, addition of the gaseous additive is discontinued and the furnace temperature is raised over a period of from 1.5 to 2.5 hours to a sintering temperature of from 1000° to 1100° C., and maintained at said sintering temperature for a period of about one hour, the sintered structure is then annealed in a steam-and-oxygen atmosphere at a temperature of from 1000° to 1150° C. for a period of from 5 to 7 hours, and the sintered structure is allowed to cool to the room temperature.

3. The method of claim 1, in which said heating temperature is 800° C.

4. The method of claim 1, in which said heating temperature is raised over a period of 2 hours.

5. The method of claim 1 in which said flow of helium through the furnace is maintained at 300 cc/min.

6. The method of claim 1 in which the flow of $BCl_3$ is maintained at from 3.5 to 5 cc/min.

7. The method of claim 1 in which the furnace temperature is raised to the sintering temperature over a period of 2 hours.

8. The method of claim 1 in which the flow of $BF_3$ is maintained at 15 cc/min.

9. The method of claim 8, in which the heating temperature is 900° C.

10. The method of producing a silica cladding layer on a structure comprising a substrate selected from the group consisting of silicon and silica, which comprises forming on said substrate a silica soot layer by flame hydrolysis deposition, placing the structure into a furnace, purging the furnace with helium at a low temperature, adding an additive selected from the group consisting of $BCl_3$ and $BF_3$ into the helium stream, raising the temperature over a period of 1.5 to 2.5 hours to a heating temperature of 900° C. or less, sintering the heated soot layer in absence of said gaseous additive by raising the temperature to from 1000° to 1100° C. over a period of from 1.5 to 2.5 hours and maintaining the sintering temperature over a period of about one hour, annealing the sintered structure in a steam-and-oxygen atmosphere at a temperature ranging from 1000° to 1150° C. for a period of from 5 to 7 hours, and allowing the annealed structure to cool to the room temperature.

11. The method of producing a silica cladding layer of claim 10, in which said sintering is conducted in a furnace which is purged at a low temperature with a stream of helium, said gaseous additive is added into the helium stream toward the end of the helium purge and the furnace temperature is raised over a period of from 1.5 to 2.5 hours to said temperature of from 800° to 900° C., 15–20 minutes after reaching said heating temperature, addition of the gaseous additive is discontinued and the furnace temperature is raised over a period of from 1.5 to 2.5 hours to a sintering temperature of from 1000° to 1100° C., and maintained at said sintering temperature for a period of about one hour, the sintered structure is then annealed in a stream-and-oxygen atmosphere at a temperature of from 1000° to 1150° C. for a period of from 5 to 7 hours, and the sintered structure is allowed to cool to the room temperature.

12. The method of producing a silica cladding layer of claim 10, in which said heating temperature is 800° C.

13. The method of producing a silica cladding layer of claim 10, in which said heating temperature is raised over a period of 2 hours.

14. The method of producing a silica cladding layer of claim 10, in which said flow of helium through the furnace is maintained at 300 cc/min.

15. The method of producing a silica cladding layer of claim 10, in which the flow of $BCl_3$ is maintained at from 3.5 to 5 cc/min.

16. The method of producing a silica cladding layer of claim 10, in which the furnace temperature is raised to the sintering temperature over a period of 2 hours.

17. The method of producing a silica cladding layer of claim 10, in which the flow of $BF_3$ is maintained at 15 cc/min.

18. The method of producing a silica cladding layer of claim 17, in which the heating temperature is 900° C.

* * * * *